United States Patent [19]
Nishiki

[11] Patent Number: 5,422,692
[45] Date of Patent: Jun. 6, 1995

[54] IMAGE PROJECTION SYSTEM

[76] Inventor: Nobuhiko Nishiki, c/o Sony Corporation 7-35, Kitashinagawa 6-chome, Shinagawa-ku, Tokyo, Japan

[21] Appl. No.: 277,616

[22] Filed: Jul. 20, 1994

[30] Foreign Application Priority Data

Jul. 21, 1993 [JP] Japan .................................. 5-201056

[51] Int. Cl.6 .................................................. G03B 3/00
[52] U.S. Cl. ...................................... 353/101; 353/69; 348/785; 348/781
[58] Field of Search ................. 353/100, 101, 122, 69, 353/70; 348/776, 781, 785, 805, 806, 826, 827, 828, 829, 830, 832

[56] References Cited

U.S. PATENT DOCUMENTS

| 4,606,628 | 8/1986 | Vance | 348/785 |
|---|---|---|---|
| 4,631,594 | 12/1986 | Imabayashi et al. | 348/781 |
| 4,672,458 | 6/1987 | McKechnie | 348/781 |
| 4,753,519 | 6/1988 | Miyatake | 342/832 |
| 5,045,930 | 9/1991 | Hasegawa | 353/101 |
| 5,293,226 | 3/1994 | Yamamoto et al. | 348/745 |
| 5,298,984 | 3/1994 | Numata | 348/826 |

Primary Examiner—William A. Cuchlinski, Jr.
Assistant Examiner—William C. Dowling
Attorney, Agent, or Firm—Limbach & Limbach

[57] ABSTRACT

An image projection system for projecting an image obtained on an image field onto a screen through a projection lens comprises a plurality of spacers overlaid with each other and arranged between the image field and the lens, each of the spacers having first and second surfaces through which the image is projected and an angle defined by the first and second surfaces being a predetermined value, an adjusting device for each of the spacers for adjusting a rotational angle of the spacers on a rotational axis substantially parallel to an image projection direction, and a fixing device for fixing the plurality of spacers relative to the image field and the lens.

3 Claims, 5 Drawing Sheets

IMAGE PROJECTION SYSTEM

BACKGROUND OF THE INVENTION

The present invention relates to image projection systems and, more particularly, to an image projection system of a spacer type which includes spacers to project an image obtained on an image field onto a screen correctly.

FIG. 1 of the accompanying drawings schematically shows an image projection system which includes a CRT (cathode ray tube) 1, a lens 2 and a screen 3 disposed with an illustrated positional relationship. The image projection system shown in FIG. 1 can project an image obtained on an image field onto a screen insofar as the CRT 1 and the lens 2 are properly placed relative to the screen 3. Therefore, if the lens 2 is disposed at a predetermined position (angle) determined by the image filed of the image projection system, such as the CRT 1 and the screen 3, it is possible to correctly project an image onto the screen 3. There is an image projection system of a spacer type which includes spacers interposed respective areas between the lens 2 and the image field of the CRT 1 to provide a necessary angle.

If the image projection system of the spacer type includes only one pattern of optical system, then it is sufficient that the image field of the CRT 1 and the lens 2 are fixed at a predetermined angle with rigid spacers. However, when an image projection system is set in an actual practice, a relationship between the surface of the screen 3 and the image field of the CRT 1 is changed variously with a combination of a screen size and an incident angle α (see FIG. 2A).

As shown in FIGS. 2A and 2B, reference symbol 6V assumes an angle (declination) in the vertical direction formed by the video screen of the CRT 1 and the end face of the lens 2 as seen from the side surface direction of the set position of the CRT 1 and the lens 2 (see FIG. 2A). Reference symbol 6H assumes an angle (declination) in the horizontal direction formed by the video surface of the CRT 1 and the end face of the lens 2 as seen from the upper surface direction of the set position of the CRT 1 and the lens 2 (see FIG. 2B). At that time, a center A of the screen 3 and an optical axis center B are not always coincident. In general, if the size of the screen 3 is large, then the angle δH is small. If the size of the screen 3 is small, then the angle δH is large. The incident angle α is changed variously in respective cases.

If all combinations of the screen sizes and the incident angles α are realized by the spacer, there should be prepared spacers of various proper sizes, which cannot be made in actual practice.

When the image projection system of the spacer type is used, predetermined angles can reliably determined in several fundamental optical systems but angles larger than the predetermined angles cannot be fine adjusted. Moreover, when angles other than those of the fundamental optical system are required, special spacers should be prepared additionally. If the thickness of the spacer itself is made variable, then the spacer itself becomes expensive. Also, those who adjust the spacer angle are required to become skillful.

Furthermore, if the lens and the video screen (CRT, etc.) are coupled with a gimbal structure having independent vertical and horizontal axes without using the spacer, accuracy between the respective axes and the bearings and a countermeasure for removing a vibration are low in reliability and disadvantageous from a cost standpoint. Moreover, upon adjustment, those who are skilled in adjustment are also required.

OBJECTS AND SUMMARY OF THE INVENTION

It is, therefore, an object of the present invention to provide an image projection system of a spacer type in which an angle of a spacer can be adjusted by those who are not so skilled.

It is another object of the present invention to provide an image projection system of a spacer type which can be made inexpensive.

It is a further object of the present invention to provide an image projection system of a spacer type which can be simplified in arrangement.

According to an aspect of the present invention, there is provided an image projection system for projecting an image obtained on an image field onto a screen through a projection lens. The image projection system comprises a plurality of spacers overlaid with each other and arranged between the image field and the lens, each of the spacers having first and second surfaces through which the image is projected and an angle defined by the first and second surfaces being a predetermined value, an adjusting device for each of the spacers for adjusting a rotational angle of the spacers on a rotational axis substantially parallel to an image projection direction and a fixing device for fixing the plurality of spacers relative to the image field and the lens.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

An image projection system according to an embodiment of the present invention will hereinafter be described with reference to the accompanying drawings.

Figure 1:
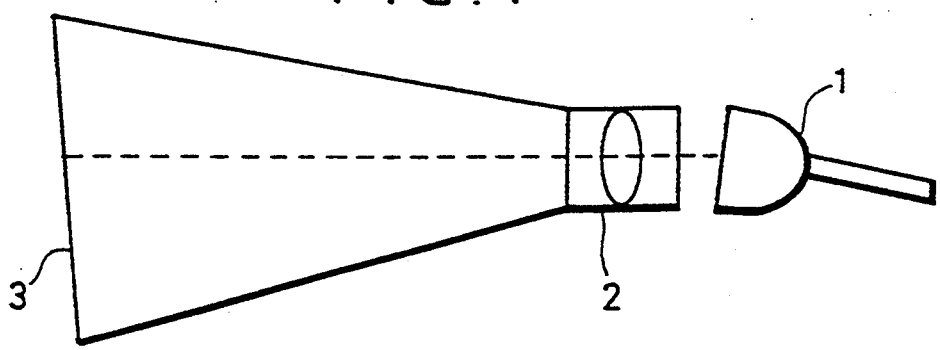
FIG. 1 is a schematic diagram showing a positional relationship among a CRT, a lens and a screen of an image projection system.
Figure 2A:
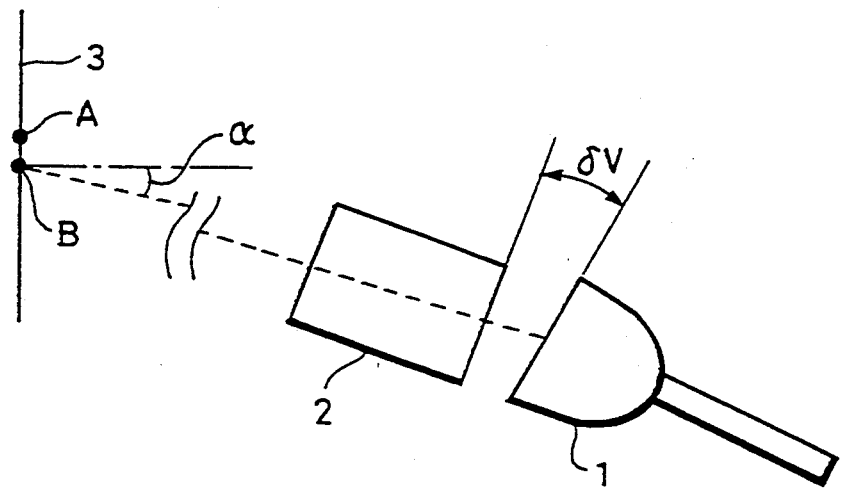
FIGS. 2A and 2B are schematic diagrams showing declinations in the vertical and horizontal directions formed by the CRT and the lens of the image projection system, respectively.

In the positional relationship among the CRT 1, the lens 2 and the screen 3 in the image projection system shown in FIG. 1, reference symbol $\delta V$ assumes an angle (declination) in the vertical direction formed by the video screen of the CRT 1 and the end face of the lens 2 as such from the side surface direction of the set position of the CRT 1 and the lens 2 (see FIG. 2A). Reference symbol $\delta H$ assumes an angle (declination) in the horizontal direction formed by the video screen of the CRT 1 and the end face of the lens 2 as seen from the upper surface direction of the set position of the CRT 1 and the lens 2 (see FIG. 2B).

Figures 3A, 3B:
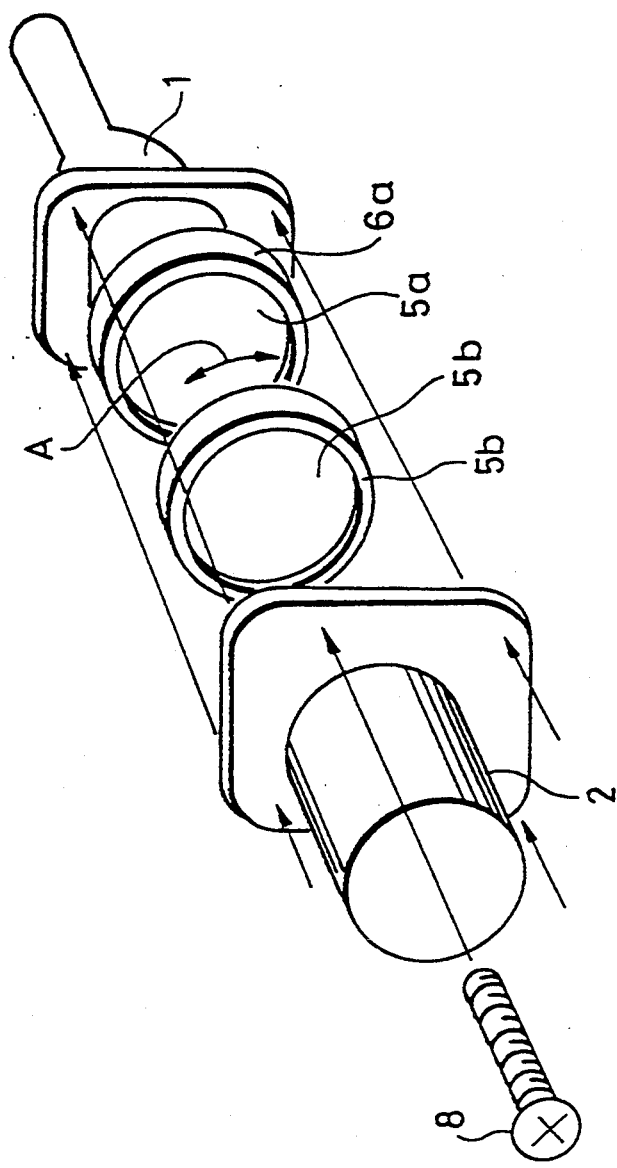
FIGS. 3A and 3B are perspective views used to explain a main portion of a spacer portion of an image projection system according to an embodiment of the present invention, respectively.

In the projection video display apparatus, as shown in FIG. 3A, spacers 5a, 5b whose respective end faces have predetermined angles are inserted between the CRT 1 and the lens 2. It is possible to obtain an arbitrary declinations expressed by the angles $\delta V$ and $\delta H$ between the CRT 1 and the lens 2 by rotating the spacers 5a, 5b in the direction shown by an arrow A in FIG. 3A, i.e., rotating the spacers 5a, 5b about a rotation axis which is the direction (z-axis direction in FIG. 3B) through which an image from the CRT 1 passes the spacers 5a, 5b toward the lens 2. These declinations $\delta V$, $\delta H$ are intrinsic angles determined by the combination of the CRT and the lens.

Figure 4A:
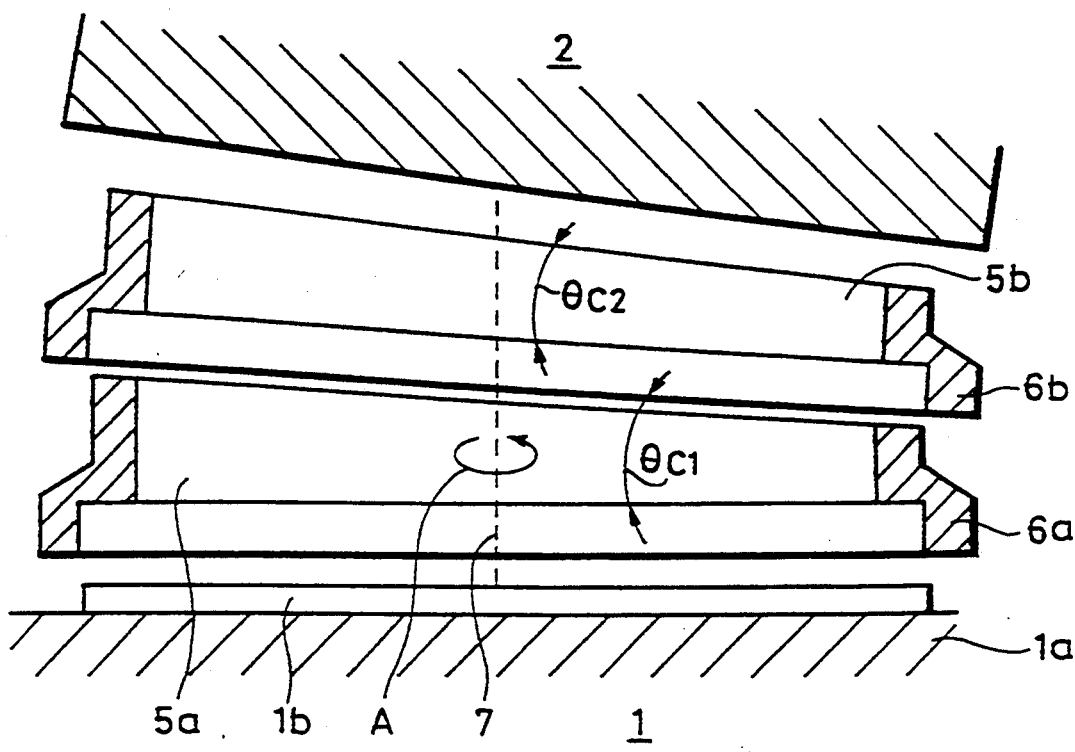
FIGS. 4A and 4B are fragmentary, enlarged cross-sectional views of the spacer portion of the image projection system according to the embodiment of the present invention, respectively.
Figure 4B:
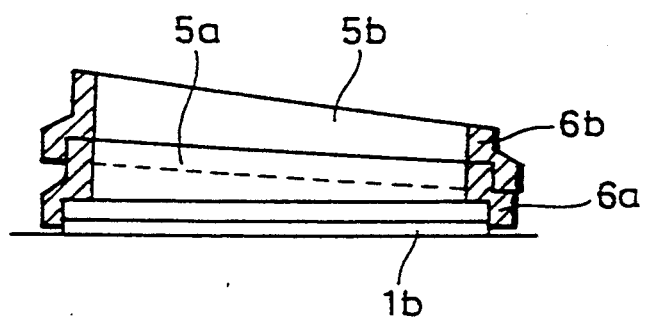

FIGS. 4A and 4B are fragmentary enlarged cross-sectional views showing a spacer portion in which the two spacers 5a, 5b are disposed as shown in FIG. 3A. FIG. 4A shows a positional relationship among the CRT 1, the spacers 5a, 5b and the lens 2. As shown in FIG. 4A, a face plate (=video screen) 1a of the CRT 1 includes a guide 1b for rotating the spacer 5a. Also, the spacers 5a, 5b respectively include guides 6a, 6b integrally formed therewith. Through these guides 1b, 6a, 6b, the spacers 5a, 5b are located such that the spacers 5a, 5b are brought in correct contact with one another at their surfaces between the face plate 1a of the CRT 1 and the end face of the lens 2. FIG. 4B shows the state that the spacers 5a, 5b are set by the guides 1b, 6a, 6b. Therefore, when the guides 6a, 6b are each rotated about a virtual rotation axis 7 in the arrow A direction (see FIG. 4A) by a rotation angle adjustment apparatus (not shown), the spacers 5a, 5b are rotated together with the guides 6a, 6b.

Reference symbol $\theta c_1$ assumes an angle formed by the respective end faces of the spacer 5a. Reference symbol $\theta c_2$ assumes an angle formed by the respective end faces of the spacer 5b. Then, the spacer 5b is rotated on the plane inclined by the spacer 5a at the angle $\theta c_1$ relative to the face plate 1a of the CRT 1. As a consequence, an angle $2\theta c$ formed by the two spacers 5a, 5b relative to the face plate 1a of the CRT 1 is expressed by the following equation (1):

$$2\theta c \leq \theta c_1 + \theta c_2 \qquad (1)$$

Then, as shown in FIG. 4A, the face plate 1a of the CRT 1 and one end face of the spacer 5a on its side opposing the CRT 1 are brought in the parallel state, and on end face of the spacer 5b at its side opposing the lens 2 and the end face of the lens 2 at its side opposing the end face of the spacer 5b are brought in the parallel state. After the necessary angle $2\theta c$ is thus obtained, the spacers 5a, 5b are secured between the CRT 1 and the lens 2 with some suitable means, such as screws 8 at the respective corners of the lens 2 (only one screw 8 is shown in FIG. 3A). As a result, the focusing plane of the image from the CRT 1 can correctly be set on the screen 3 relatively easily.

Figure 2B:
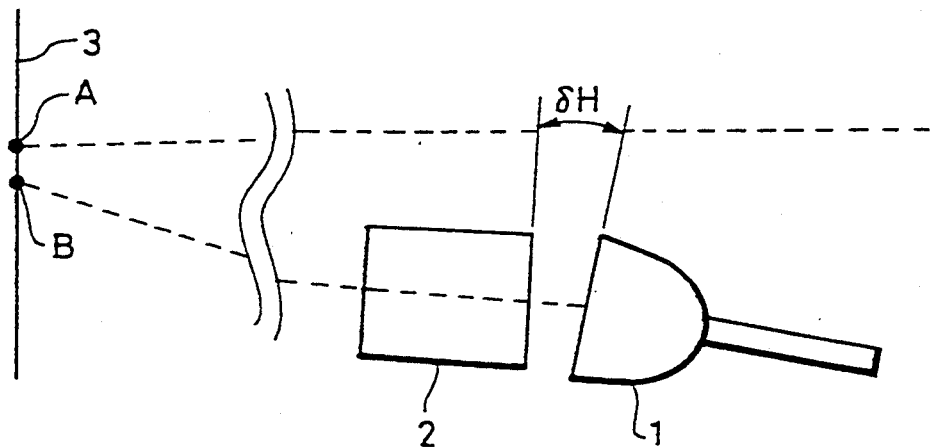

Assuming now that a relationship is established between the angles $\theta c_1$ and $\theta c_2$ formed by the respective end faces of the spacers 5a, 5b as shown by the following equation (2):

$$\theta c_1 = \theta c_2 = \theta \qquad (2)$$

then let us consider respective rotational amounts of the spacers 5a, 5b required when the angles $\delta V$, $\delta H$ shown in FIGS. 2A and 2B, i.e., intrinsic declinations determined by individual combinations of the CRT and the lens are obtained.

As shown in FIG. 3B, assuming that the face plate 1a of the CRT 1 is disposed on the XY plane and its vertical direction is on the Z axis, then a lower side of the face plate 1a of the CRT 1 seen from the direction opposing the face plate 1a is assumed to be a positive direction of the Y axis, a right-hand side thereof is assumed to be a positive direction of the X axis, and this side is assumed to be a positive direction of the Z axis.

The Z axis shown in FIG. 3B is assumed to be a rotational axis of the spacer 5a and its rotational angle relative to the X axis is assumed to be $\theta_A$, a normal of the spacer 5b relative to the center of the end face facing the spacer 5a is assumed to be a rotational axis of the spacer 5b, and a rotational angle relative to a base line (FIG. 5) of the spacer 5a is assumed to be $\theta_B$. Then, an angle $2\theta c$ of the two spacers 5a, 5b relative to the CRT face plate 1a is maximized as:

$$2\theta c = 2\theta \qquad (3)$$

Figure 5:
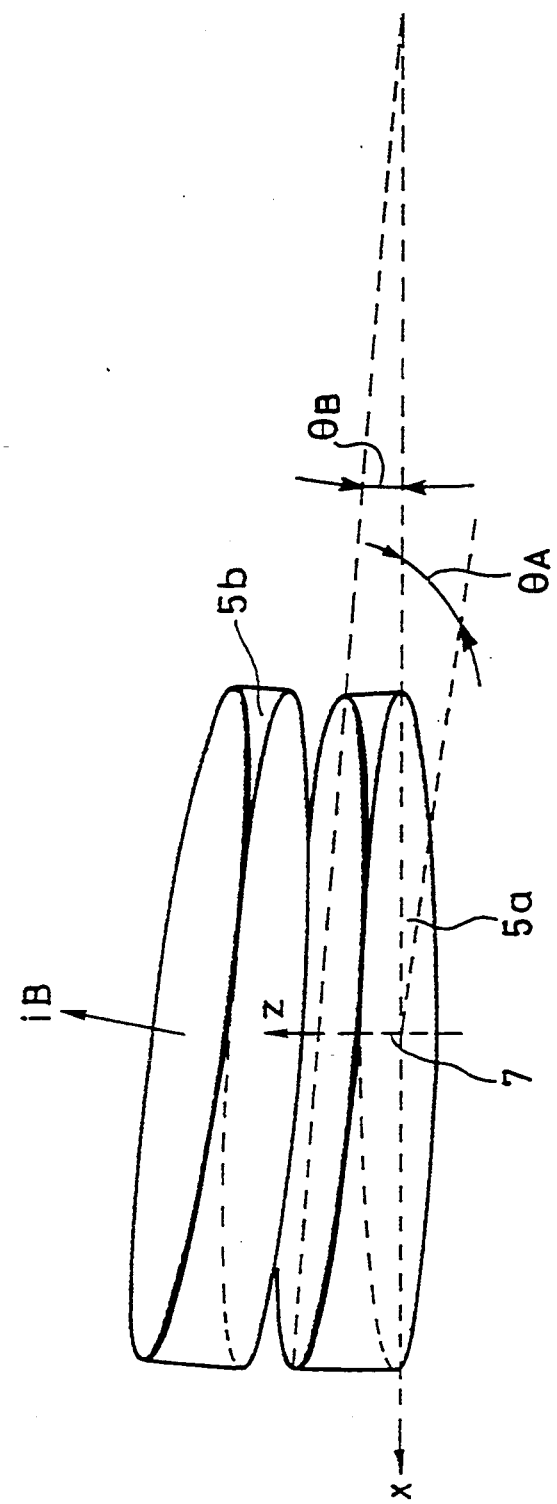
FIG. 5 is a schematic diagram showing the disposed state of only the spacer in the image projection system according to the present invention.

This state is illustrated in FIG. 5. In the state shown in FIG. 5, let it be assumed that the rotational angles $\theta_A$, $\theta_B$ are 0 degree and 180 degrees, respectively.

Figure 6:
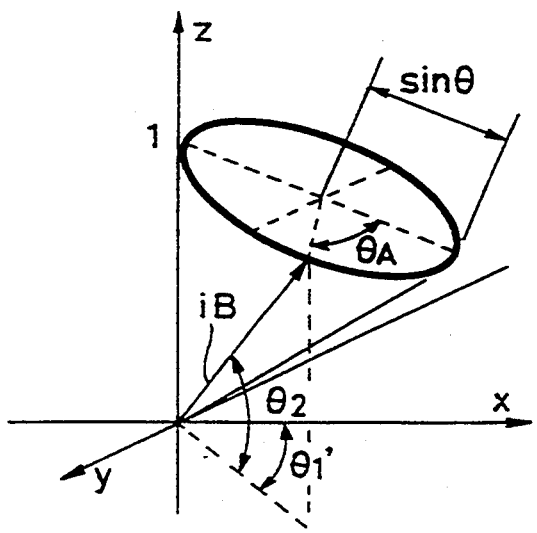
FIG. 6 is a diagram showing a rotation trajectory of a directional cosine of the spacer of the image projection system according to the present invention.
Figure 7A:
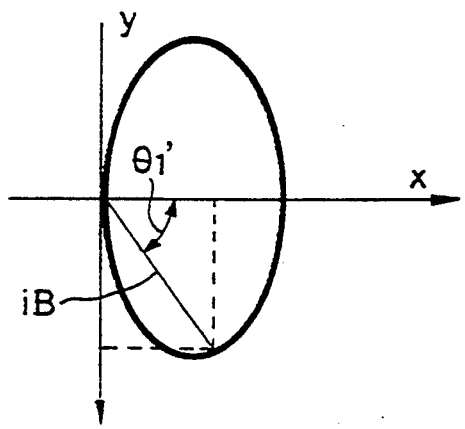
FIGS. 7A and 7B are projection drawings showing rotation trajectory obtained when the direction cosine of the spacer shown in FIG. 6 is projected onto the XY plane and the YZ plane, respectively.
Figure 7B:
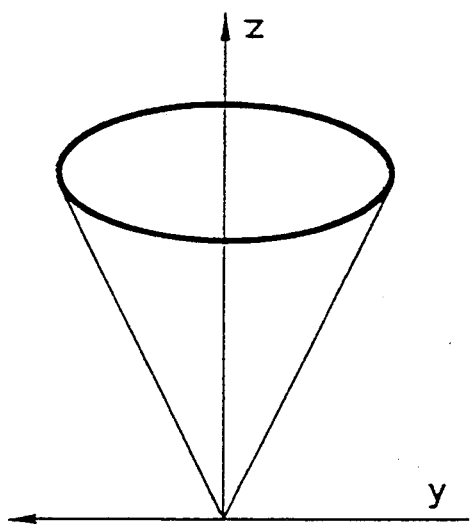

Assuming that iB (x, y, z) is the direction cosine of the upper end surface of the spacer 5b shown in FIG. 5, then the direction cosine iB is expressed by the following equation (4) as shown in polar coordinates shown in FIG. 6 and FIG. 7A:

$$iB = (\cos\theta \sin\theta (1-\cos\theta_B), -\sin\theta \sin\theta_B, 1-\sin^2\theta(1-\cos\theta_B)) \qquad (4)$$

In the state shown in FIG. 5, since the spacer 5a is not rotated but fixed, the rotational angle $\theta_A$ is equal to 0.

Having considered the direction cosine iB in the displayed form of polar coordinates, FIG. 6 and FIG. 7A show the states that the direction cosine iB is expressed by the following equation (5):

$$iB = (\theta_1', \theta_2, 1) \qquad (5)$$

When the spacer 5a is fixed and the spacer 5b is rotated by 360 degrees, the tip end of the normal (=direction cosine) iB on the upper end face of the spacer 5b draws a circular locus as seen from the direction perpendicular to the spacer 5a at its end face opposing the spacer 5b. As shown in FIG. 6, the length of the radius of this circular locus corresponds to $\sin\theta$.

A direction cosine i1 (x, y, z) of the inclined surface corresponding to the angles $\delta H$, $\delta V$ shown in FIGS. 2B and 2A is expressed as:

$$i1 = \{\sin \delta H \cos \delta V, \cos \delta H \sin \delta V, \sqrt{(\cos^2 \delta H \cos^2 \delta V + \sin^2 \delta V \sin^2 \delta H)}\} \quad (6)$$

If the polar coordinates of the direction cosine i1 are expressed as:

$$i1 = (\theta_1, \theta_2, 1) \quad (7)$$

an azimuth angle $\theta_1$ is expressed by using the angles $\delta H$, $\delta V$ as follows:

$$\theta_1 = \tan^{-1}(y/x) = \tan^{-1}(\cos \delta H \sin \delta V / \sin \delta H \cos \delta V) \quad (8)$$

where $-90 < \delta V < 90$.

When $\delta H = 0$, if $\delta V > 0$, then $\theta_1 = 90$ degrees; if $\delta V = 0$, then $\theta_1 = 0$ (not defined); and if $\delta V < 0$, then $\theta_1 = -90$ degrees.

An elevation angle $\theta_2$ is expressed by using the angles $\delta V$, $\delta H$ as follows:

$$\theta_2 = \sin^{-1}(z) = \sin^{-1}\sqrt{(\sin^2 \delta V \sin^2 \delta H + \cos^2 \delta H \cos^2 \delta V)} \quad (9)$$

Subsequently, the rotational angle $\theta_B$ which provides an elevation angle equal to the elevation angle $\theta_2$ is obtained by rotating the spacer 5b under the condition that the spacer 5a is fixed ($\theta_A = 0$).

In this state, since the foregoing equation (5), i.e., $iB = (\theta_1', \theta_2, 1)$ is established, the equation (4) yields the following equation (10):

$$\sin \theta_2 = z = 1 - \sin^2 \theta (1 - \cos \theta_B) \quad (10)$$

Thus, the rotational angle $\theta B$ is expressed as:

$$\theta_B = \cos^{-1}(1 + (\sin \theta_2 - 1)/\sin^2 \theta) \quad (11)$$

Therefore, it is possible to calculate, from the elevation angle $\theta_2 \phi$ the polar coordinates of the spacer 5b obtained by the angles $\delta V$ and $\delta H$ and from the angle $\theta$ formed by respective end surfaces of each of the spacers 5a, 5b, the rotation angle $\theta_B$ of the spacer 5b relative to the base line (see FIG. 5) with the normal relative to the spacer 5b at its center of the end face opposing the spacer 5a as its rotation axis.

After the rotational angle $\theta_B$ is calculated, it is possible to calculate the rotational angle $\theta_A$ of the spacer 5a relative to the x axis with the Z axis shown in FIG. 3B as the rotation axis by subtracting from the azimuth angle $\theta_1$ of the polar coordinates of the direction cosine on the upper end face of the spacer 5b the azimuth angle $\theta$ which is the value of the polar coordinates of the direction cosine iB (rotational angle $\theta_A = 0$).

Accordingly, the rotational angle $\theta_A$ is expressed as:

$$\theta_A = \theta_1 - \theta_1' \theta_1' = -\tan^{-1}(\sin \theta \sin \theta_B / \cos \theta \sin \theta (1 - \cos \theta_B)) \quad (12)$$

As described above, according to the embodiment of the present invention, the rotational angle $\theta_A$ of the spacer 5a relative to the x axis with the Z axis shown in FIG. 3B as the rotation axis and the rotational angle $\theta_B$ of the spacer 5b with the normal perpendicular to its center of the end face opposing the spacer 5a as the rotation axis and relative to the base line of the spacer 5a can be calculated with ease. Further, the image projection system according to the present invention is simple in arrangement in which the spacer 5 includes the guide 6 and only the rotational angle of the guide 6 is adjusted. The image projection system according to the embodiment of the present invention can be made inexpensive.

Furthermore, since the image projection system according to the present invention need not prepare the spacer 5 for every optical system separately, parts thereof need not be changed when the rotational angle of the spacer 5 is adjusted. After the rotational angle of the spacer 5 is adjusted, if the spacer 5 or the guide 6 is fixed by a rotational angle fixing means having a proper pressing force, such as the screw 8 disposed between the lens 2 and the image field of the CRT 1 (face plate 1a), a spring or the like, not shown in FIG. 3A, then it becomes possible for the user to adjust the rotational angle while watching a picture on the screen 3 in actual practice.

According to the image projection system of the present invention, since the arrangement of the spacer itself can be simplified, the manufacturing cost of the spacer can be reduced. Also, since the different spacers need not be prepared for every optical system, the parts of the image projection system need not be changed when the rotational angle of the spacer is adjusted.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An image projection system for projecting an image obtained on an image field onto a screen through a projection lens, comprising:
    a plurality of spacer means overlaid with each other and arranged between said image field and said lens, each of said spacer means having first and second surfaces through which said image is projected and an angle defined by said first and second surfaces being a predetermined value;
    adjusting means for each of said spacer means for adjusting a rotational angle of said spacer means on a rotational axis substantially parallel to an image projection direction; and
    fixing means for fixing said plurality of spacer means relative to said image field and said lens.

2. An image projection system according to claim 1, wherein said image field includes a cathode ray tube.

3. An image projection system according to claim 1, wherein said adjusting means includes guide means surrounding each of said spacer means.

* * * * *

UNITED STATES PATENT AND TRADEMARK OFFICE
CERTIFICATE OF CORRECTION

PATENT NO. : 5,422,692
DATED : June 6, 1995
INVENTOR(S) : Nobuhiko Nishiki

It is certified that error appears in the above-indentified patent and that said Letters Patent is hereby corrected as shown below:

On the title page the Patent Assignee is added as follows:

Item [73] Sony Corporation, Tokyo, Japan.

Signed and Sealed this

Eighteenth Day of June, 1996

Attest:

BRUCE LEHMAN

*Attesting Officer*     *Commissioner of Patents and Trademarks*